June 4, 1940. N. H. McCLEARY Re. 21,474

HEATING PAD

Original Filed June 19, 1939 2 Sheets-Sheet 1

INVENTOR.
Nolen H. McCleary
BY McSaughlin & Wallenstein
ATTORNEYS

June 4, 1940. N. H. McCLEARY Re. 21,474
HEATING PAD
Original Filed June 19, 1939 2 Sheets-Sheet 2
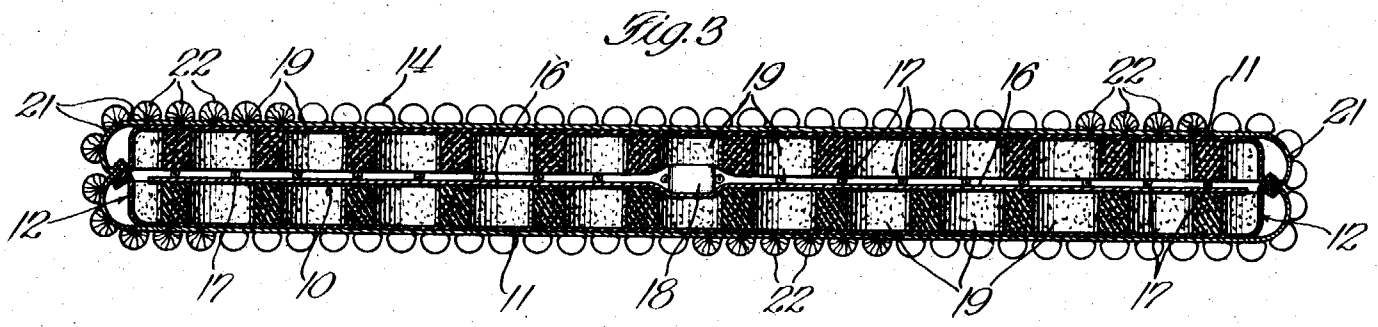
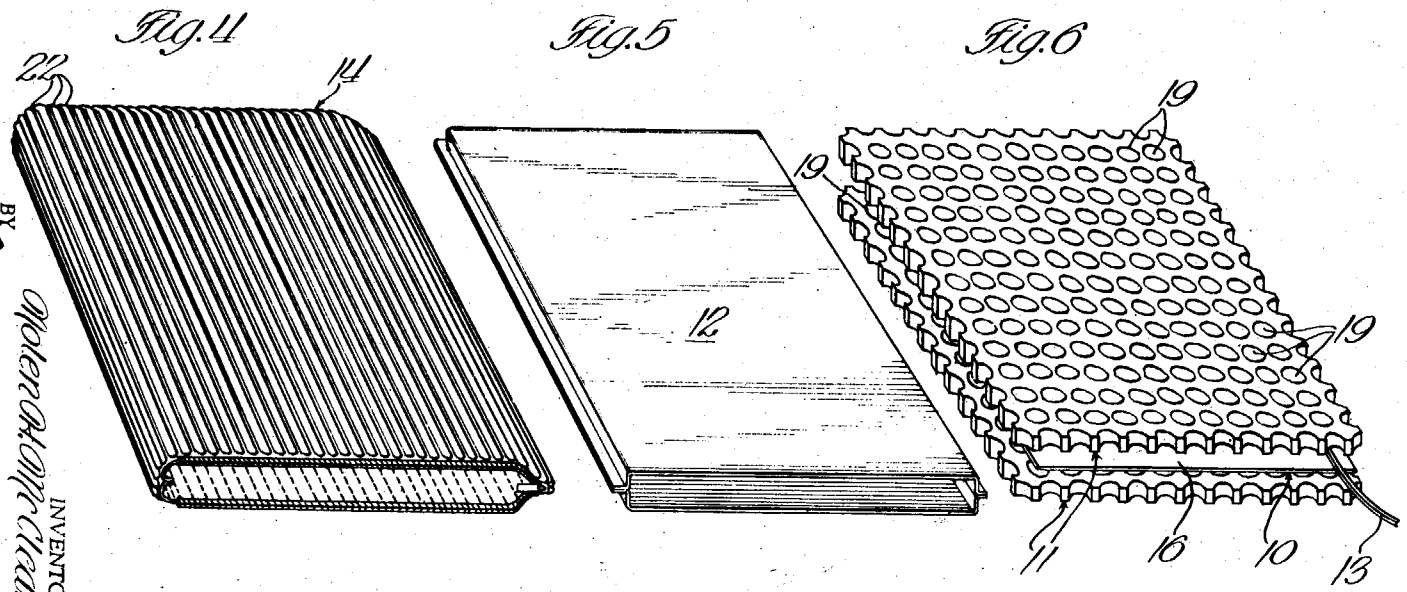
INVENTOR.
Nolen H. McCleary
BY McLaughlin & Wallenstein
ATTORNEYS Reissued June 4, 1940

Re. 21,474

UNITED STATES PATENT OFFICE 21,474

HEATING PAD

Nolen H. McCleary, Chicago, Ill., assignor to Benjamin E. Lawrence, Chicago, Ill.

Original No. 2,185,692, dated January 2, 1940, Serial No. 279,876, June 19, 1939. Application for reissue March 4, 1940, Serial No. 322,266

11 Claims. (Cl. 219—46)

My invention relates to heating pads.

Heat has long been used for the relief of pain. In modern practice, its therapeutic value has increased rather than decreased. The constant improvement, for a score of years, or more, of the so-called electric heating pad has brought this device to the forefront in the heat therapy field. It has achieved this position despite recognized imperfections which those in the industry have sought to overcome.

A factor of considerable significance has been the control of heat. The usual practice has been to attach resistance wire, suitably covered, as with asbestos, to a supporting sheet-like member, such as suitably treated canvas, woven asbestos fabric or the like. Current control means are employed, conventionally secured to the same support as the resistance wire. Because of the necessity, in most cases, of providing for the control of the heat at several temperatures, and the difficulties involved therein, several thermostatic elements are employed as a rule, sometimes with multiple wiring and with multiple leads thereto.

The effect of this practice, for a number of years more or less conventional, is the presence within the pad of considerable hard or unyielding inclusions which make contact with the body, particularly when the patient is lying on the pad or holding it to a tender part, such as the face, either distasteful or painful. Those skilled in the art have sought for remedies for this condition, such as decreasing the size of thermostats, changing the character of the wire, and the like, but principally in attempts to devise padding means which will not impair the delivery of heat to the outside. Requirements of the fire underwriters have been a limiting factor in development, and because of the character of the device, approval of the underwriters laboratories is important from the standpoint of both the manufacturer and user.

One direction which development has taken is in the use of textile padding. This must be placed within or on the outside of the imperforate rubber envelope demanded by fire underwriters' specifications. No attempt in this direction has met with full success, because of the fire hazard introduced, the introduction of material which will fail because of the absorption of moisture, such as perspiration, the ineffectiveness of the material supplied as a cushion, or the loss of heat which results. At times, all of these disadvantages may be encountered.

The principal object of my invention is to overcome the problems outlined hereinabove.

Another object is the provision of an improved heating pad.

A further object is the provision of a heating pad so adequately cushioned that a patient may lie on it with comfort, but which nevertheless will respond to deliver heat substantially to the extent as a generally similar pad not similarly cushioned.

In carrying out my invention, I employ material normally deemed of high heat insulating character, but so construct and employ such material that it has fully adequate cushioning action and only very slight heat insulating action. I preferably employ the imperforate, relatively thin rubber envelope referred to hereinabove, and may employ suitably designed material of my invention either within or on the outside of this envelope. Maximum cushioning effect is obtained with both. Within the rubber envelope, I employ, in a preferred embodiment, a layer of sponge rubber, provided with a series of openings insufficient in character and number to materially decrease the cushioning character of the sponge rubber, but sufficient in total area to pass at least the major proportion of the heat generated by the heating element. Exteriorly of the rubber envelope, I preferably utilize an outside envelope of textile material, having spaced sections of piling. The piling is substantially vertical to a supporting body of cloth, and, while it has more cushioning action as a heavy pad fabric, it has very little resistance to the flow of heat waves.

A preferred embodiment of the invention is shown in the accompanying drawings. Other objects and features of the invention will be described in the detailed description of this preferred embodiment.

In the drawings,

Fig. 3 is an enlarged cross sectional view taken on the line 3—3 of Fig. 1;

Fig. 4 is a perspective view of the outer envelope;

Fig. 5 is a perspective view of the rubber envelope, with the contents thereof removed; and Fig. 6 is an exploded view indicating the relationship of the parts which are assembled within the rubber envelope of Fig. 5.

For convenience, reference will first be made to

Figure 1:
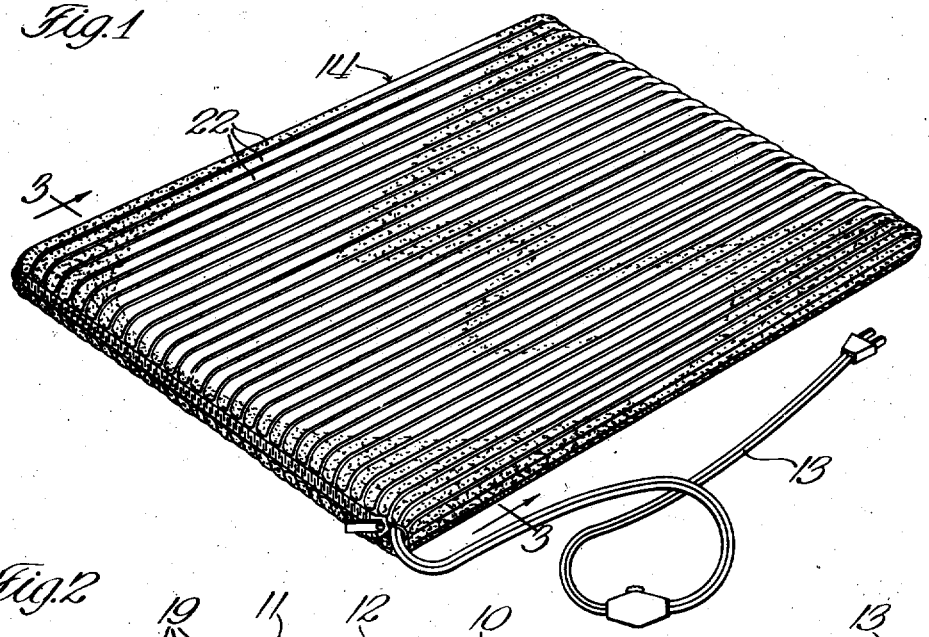
Fig. 1 is a perspective view showing the complete heating pad.
Figure 2:
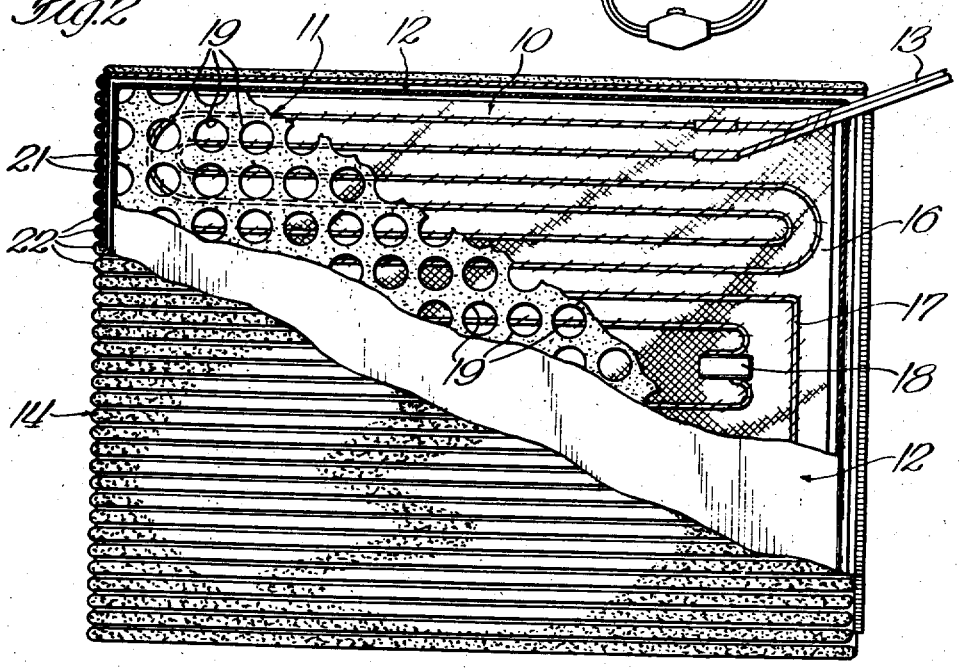
Fig. 2 is a plan view, with portions broken away to illustrate the relationship of the parts.

Figs. 4 to 6, inclusive, which show the main parts of the complete pad. A heating element and heat control assembly 10 is sandwiched between layers 11 of perforated aerated elastic material, such as sponge rubber, and inserted in a rubber envelope 12. This rubber envelope is suitably but permanently closed, the cord conductor 13 extending through the closed edge. The rubber envelope and contents are inserted in the "zipper"-fastened outer envelope 14, the resulting assembled product being shown in Fig. 1. The principal details of construction of the parts will be explained, and the reasons for and advantages of the construction used.

The member 10 may be conventional. It comprises a sheet-like support 16, to which resistance wire 17 is secured, as by stitching. The wire and support are properly selected so as to avoid burning. The wire may be suitably covered with asbestos, and the support may be either a suitable canvas fabric, or an asbestos fabric. Fig. 3 shows, in elevation, a thermostat 18, and any suitable number may be used, depending upon the design of the electrical circuit employed.

The layers 11 are preferably sponge rubber, with regularly arranged holes or perforations 19 extending entirely therethrough. Preferably, a layer 11 is provided on both sides of the member 10, so that either side of the pad may be placed against the body. In a standard size of pad, these layers are suitably one-quarter to three-eighths of an inch thick, and the total area of the holes is from one-third to one-half the total area of the layer. The design of the holes may vary, but round holes seem to be preferred to accomplish the object of the invention, namely, to combine full cushioning action and maximum heat transfer.

The rubber envelope 12 may be a thin rubber without fabric backing, but a combination of a thin fabric and rubber is preferred. It may be secured, or adhesively secured, at the edges, depending upon the desire of the manufacturer and the type of rubber material used. Preferably, I employ a thin rubber-fabric material and close it by a double stitching operation. Because of the insulating character of the layers 11, the rubber envelope 12 may, if desired, be dispensed with in favor of a simple type of fabric bag, but the advantages of the rubber envelope are sufficiently marked that I prefer to use it.

The outer envelope may be of plain weave, and formed as shown to permit ready removal for laundering, the cushioning effect of the layers 11 being adequate for all practical purposes. As shown, however, it includes a cloth base 21, with sections 22 of piling spaced from each other. This piling, as indicated, is attached to the cloth base in such a manner that its individual threads are perpendicular to the cloth base. As a consequence of this construction, surprisingly enough, there is very little resistance to the passage of heat, the effect being almost the same as if only the cloth base 21 were present. The piling, however, provides greater cushioning effect than would be provided by a heavily woven cloth of comparable thickness, which cloth would have a pronounced heat insulating effect. As a consequence of the cushioning action of the outer envelope 14, it may be used without the layers 11, where the full cushioning action obtained by the conjoint use of both is not desired. I regard this feature as an important, though limited, aspect of my invention.

The preferred embodiment of my invention, as shown in the drawings, may be modified in various ways. In general, most of the modifications embodying the concepts of the present invention are clear from the preceding description or are obvious to the skilled manufacturer. It may be noted, however, that the thin rubber envelope may be left out of the combination, or it may be substituted by a textile envelope. The sponge rubber layers may be housed within the outside envelope, and on the outside of the thin rubber envelope. The thin rubber sheeting comprising the envelope may be vulcanized onto the rubber layers, and the assembly then vulcanized at the three edges, or, alternatively, the holes 19 may extend only part way through the sponge rubber layer, leaving a thin, imperforate outer layer as the equivalent of the thin rubber envelope.

I have explained my invention in detail in order that those skilled in the art may understand and practice it, but the claims are to be taken as definitive of its scope.

What I claim as new and desire to protect by Letters Patent of the United States is:

1. In a heating pad, a sheet-like support for a heating element, a heating element, as a resistance wire, secured to said sheet-like support, a sponge rubber pad on at least one side of said heating element, and an outer imperforate covering for said sheet-like support and pad, said sponge rubber pad provided with perforations sufficient in total area to permit a substantial proportion of the heat from said heating element readily to pass therethrough, but insufficient to permit breakdown of the essential structure of said pad under pressure, whereby not to impair appreciably its cushioning function.

2. In a heating pad, a heating element member of general sheet-like character, sponge rubber layers on opposite sides thereof, and an imperforate rubber bag member enclosing the heating element member and sponge rubber layers, said sponge rubber layers provided with a plurality of substantially regularly arranged perforations, the total area of all of said perforations comprising from one-third to one-half of the area of one surface through which they extend.

3. In a heating pad, a sheet-like support member, resistance wire secured thereto to form a heating element, a thermostat secured to said support member and connected to said resistance wire to limit the temperature of said wire in response to the passage of electric current therethrough, an imperforate rubber envelope enclosing the whole, and an outer envelope of textile material enclosing said rubber envelope, said textile material comprising a relatively thin cloth base, and a plurality of regularly arranged spaced sections of piling substantially vertical to said cloth base, whereby said piling provides a cushioning action without limiting appreciably the passage of heat through the textile material as a whole.

4. In a heating pad, a sheet-like support member, resistance wire secured thereto to form a heating element, a thermostat secured to said support member and connected to said resistance wire to limit the temperature of said wire in response to the passage of electric current therethrough, an imperforate rubber envelope enclosing the whole, and an outer envelope of textile material enclosing said rubber envelope, said textile material comprising a relatively thin cloth base, and a plurality of parallel spaced ridges of piling, the piling of said ridges composed of fibers disposed substantially vertical to the plane of said cloth, whereby said ridges of piling provide a cushioning action without limiting appreciably the passage of heat through the textile material as a whole.

5. The combination defined in claim 4, wherein said envelope of textile material is releasably closed along one edge thereof, whereby to permit ready removal thereof for laundering or exchange for a similar envelope.

6. The combination in a heating pad of the type employing an electric heating and control means, including electric resistance wires and thermostats secured to a sheet-like base, of a pair of layers of aerated elastic rubber-like material having a plurality of perforations therein, the total area of which is from about one-third to one-half of the area of said layers, an imperforate rubber envelope enclosing the same, and an outer envelope of textile material enclosing said rubber envelope, said textile material comprising a relatively thin cloth base, and a plurality of regularly arranged spaced sections of piling substantially vertical to said cloth base, whereby said piling provides a cushioning action without limiting appreciably the passage of heat through the textile material as a whole.

7. The combination in a heating pad of the type employing an electric heating and control means, including electric resistance wires and thermostats secured to a sheet-like base, of a pair of layers of aerated elastic rubber-like material having a plurality of perforations therein, the total area of which is from about one-third to one-half of the area of said layers, and an outer envelope of textile material, said textile material comprising a relatively thin cloth base, and a plurality of regularly arranged spaced sections of piling substantially vertical to said cloth base, whereby said piling provides a cushioning action without limiting appreciably the passage of heat through the textile material as a whole.

8. In a heating pad, a sheet-like support member, resistance wire secured thereto, thermostatic control means associated with said wire to limit the delivery of electric current thereto in response to predetermined temperature, a layer of perforated sponge rubber on opposite sides of said support member to enclose the same, and cushion said resistance wire and thermostat means, an imperforate rubber envelope enclosing all of said previously described members, and an outer envelope of textile material enclosing said rubber envelope, wherein the perforations of each sponge rubber layer are regularly arranged, and their total area comprises from about one-third to one-half of the total area of the layers, whereby not more than ten to fifteen percent of the heat is absorbed by said layers, and the cushioning action thereof is substantially unimpaired.

9. In a heating pad, a sheet-like support member, resistance wire secured thereto to form a heating element, a thermostat secured to said support member and connected to said resistance wire to limit the temperature of said wire in response to the passage of electric current therethrough, an envelope enclosing the whole, and another and outer envelope of textile material enclosing said first-mentioned envelope, said textile material comprising a relatively thin cloth base, and a plurality of regularly arranged spaced sections of piling substantially vertical to said cloth base, whereby said piling provides a cushioning action without limiting appreciably the passage of heat through the textile material as a whole.

10. In a heating pad, a sheet-like support member, resistance wire secured thereto to form a heating element, a thermostat secured to said support member and connected to said resistance wire to limit the temperature of said wire in response to the passage of electric current therethrough, an envelope enclosing the whole, and another and outer envelope of textile material enclosing said first-mentioned envelope, said textile material comprising a relatively thin cloth base, and a plurality of parallel spaced ridges of piling, the piling of said ridges composed of fibers disposed substantially vertical to the plane of said cloth, whereby said ridges of piling provide a cushioning action without limiting appreciably the passage of heat through the textile material as a whole.

11. The combination in a heating pad of the type employing an electric heating and control means, including electric resistance wires and thermostats secured to a sheet-like base, of a pair of layers of aerated elastic rubber-like material having a plurality of perforations therein, the total area of which is from about one-third to one-half of the area of said layers, an envelope enclosing the same, and another and outer envelope of textile material enclosing said first-mentioned envelope, said textile material comprising a relatively thin cloth base, and a plurality of regularly arranged spaced sections of piling substantially vertical to said cloth base, whereby said piling provides a cushioning action without limiting appreciably the passage of heat through the textile material as a whole.

NOLEN H. McCLEARY.